Oct. 29, 1963     O. H. KOSKI     3,108,859
PULSED EXTRACTION COLUMN
Filed Dec. 15, 1959     2 Sheets-Sheet 1
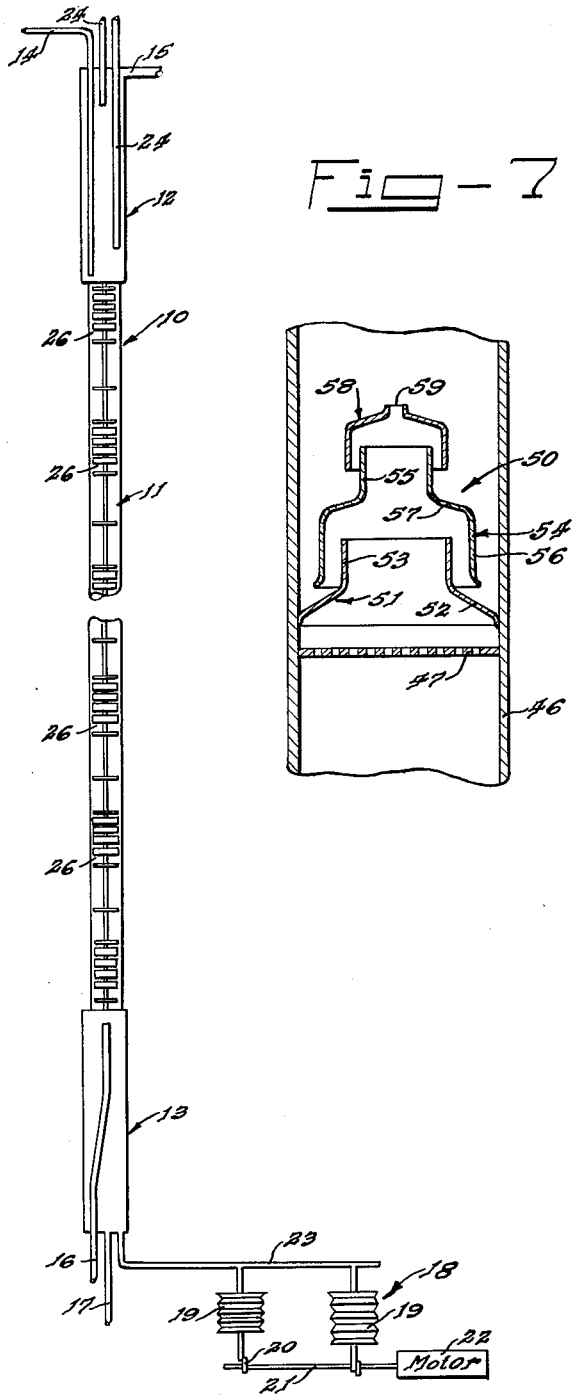
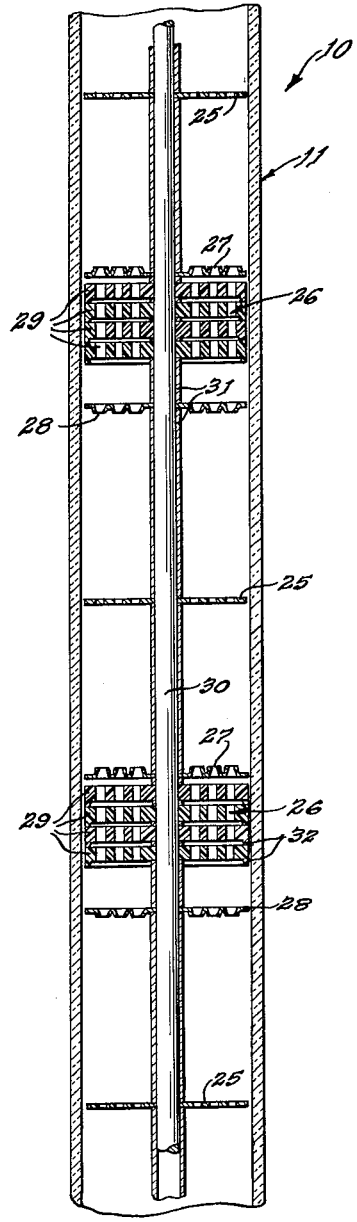
INVENTOR.
Oscar H. Koski
BY
Roland A. Anderson
Attorney Oct. 29, 1963   O. H. KOSKI   3,108,859
PULSED EXTRACTION COLUMN
Filed Dec. 15, 1959   2 Sheets-Sheet 2
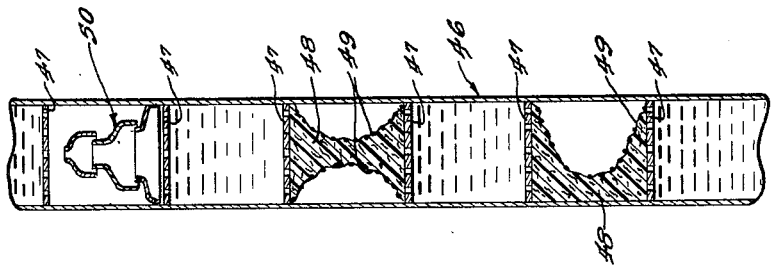
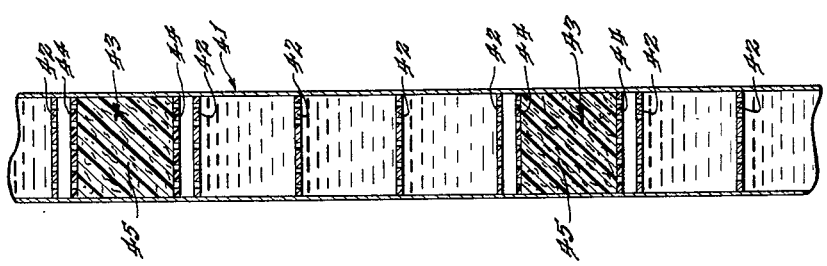
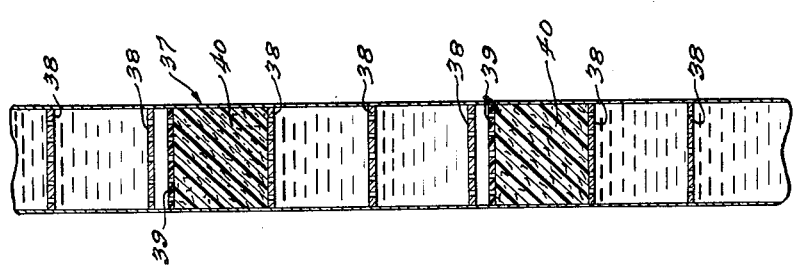
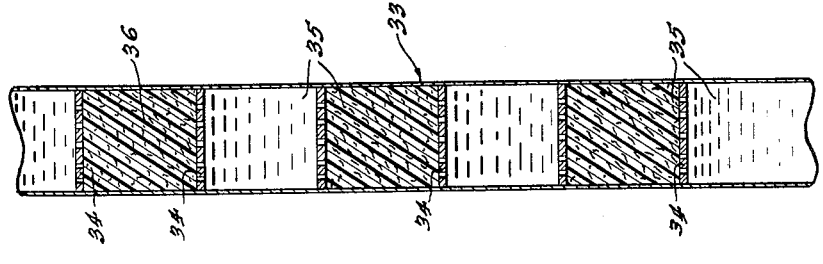
INVENTOR.
Oscar H. Koski
BY
Roland A. Anderson
Attorney

United States Patent Office 3,108,859
Patented Oct. 29, 1963

3,108,859
PULSED EXTRACTION COLUMN
Oscar H. Koski, Richland, Wash., assignor to the United
States of America as represented by the United States
Atomic Energy Commission
Filed Dec. 15, 1959, Ser. No. 859,825
2 Claims. (Cl. 23—310)

This invention relates to a new and improved method and apparatus for contacting immiscible liquids having different specific gravities. In more detail the invention relates to pulsed, countercurrent extraction columns and a method for their operation.

A pulse column is a substantially vertical column in which at least two fluids or phases are moved countercurrently to each other. One fluid enters near the bottom and is withdrawn at the top while the other fluid enters near the top and is withdrawn at the bottom. Between the inlets the fluids are thoroughly mixed in order that one fluid may extract a solute from the other. It is preferred that the fluids be immiscible and the lighter fluid enters at the lower inlet while the heavier liquid enters near the top.

Most extraction columns have means for enhancing the mixing. This may take the form of packing such as Raschig rings or of fixed plates disposed horizontally one above the other within the column. The plates are perforated to permit alternate passage of the liquids in opposite directions. In a pulse column, a pulsed motion of the liquids is superimposed on the gravity flow. By control of operating conditions, one of the phases is made continuous and the other dispersed.

A pulse column may be operated under mixer-settler-type conditions or under emulsion-type conditions with the rate of throughput determining which conditions are obtained. Mixer-settler-type operation is characterized by the separation of the light and heavy phases into discrete, clear layers in the interplate space during the quiescent portions of the pulse cycle. During the upward portion of the pulse movement the light phase initially resting under the sieve plate is forced up through the perforations and rises in fairly large globules through the heavy phase layer above the plate. Similarly the heavy phase descends during the downward movement of the pulse. Under mixer-settler-type phase-dispersion conditions the operation of the pulse column is highly stable but relatively inefficient compared with operation of the same column under emulsion-type conditions.

The emulsion-type operation, occurring at higher throughput rates and frequencies, is characterized by small drop size and fairly uniform dispersion of the discontinuous phase, with little change in phase dispersion in the course of the pulse cycle. The intimate interphase contact renders this the most efficient type of operation.

It is apparent from the above discussion that normal operation of a pulse column under mixer-settler-type conditions results in alternation of dispersed and continuous phases within every interplate space during operation of the column. That is, within each interplate space, during one portion of the pulse cycle one of the phases will be continuous and during the other portion of the pulse cycle the other phase will be continuous. A description of the operation of a pulse column appears in Chemical Engineering Progress for August 1954, pages 396 to 398.

It is an object of the present invention to improve the operating efficiency of pulsed countercurrent liquid-liquid extraction columns.

According to the present invention alternation of continuous phases may be obtained when a column is undergoing emulsion-type operation by operating the pulse column so that each phase progresses through alternate layers where one phase is continuous and regions where the other phase is continuous in its path through the column. This is accomplished by packing a column containing spaced plates of a material which is wet by one of the phases with a material which is wet by the other phase and the following description sets forth several ways in which this packing can be made. Such a column can be operated under either mixer-settler- or emulsion-type conditions. An additional facet of the invention resides in the use of loose packing of the type mentioned just above in which case separation and disengagement of the two phases will occur and also in the use of a mechanical insert to accomplish this purpose.

The invention will next be described with reference to the accompanying drawings wherein:

FIG. 1 is a diagrammatic view of a pulsed countercurrent liquid-liquid extraction apparatus illustrating the present invention;

FIG. 2 is an enlarged sectional view thereof showing the packing within the column;

FIGS. 3, 4 and 5 are diagrammatic views illustrating various ways in which packing can be added to a pulse column to accomplish the purposes of the present invention;

FIG. 6 is a diagrammatic view of a pulse column incorporating several different means for separating and disengaging phases; and FIG. 7 is a more detailed view of one of the aforesaid means for separating and disengaging phases.

As shown in FIGS. 1 and 2, a pulsed liquid-liquid extraction apparatus according to the present invention comprises a cylindrical column 10 which includes an extraction section 11 and upper and lower disengaging sections 12 and 13 respectively.

The column is provided with an inlet 14 for heavy liquid at one end of the column, an outlet 15 for light liquid at the same end of the column, an inlet 16 for light liquid at the other end of the column, and an outlet 17 for heavy liquid at the said other end of the column. A pulse generator 18 consisting of two bellows 19, two cams 20, a shaft 21 and a motor 22 applies a pulse to the contents of column 10 through a pulse transmission line 23, while dip tubes 24 are used to measure the interface between phases.

As shown in FIG. 2, perforated plates 25 are located at spaced intervals throughout the extraction section 11 of the column. Intermediate of these plates 25 is a phase reversing cartridge 26 which constitutes a major portion of the present invention.

Each phase reversal cartridge 26 includes an upper stainless steel nozzle plate 27 with nozzles pointed up and a lower stainless steel nozzle plate 28 with nozzles pointed down. Located between these nozzle plates are a plurality of sieve plates 29, for example four. Sieve plates 29 are constructed of a different material from plates 25, 27 and 28. These materials are so chosen that one of the phases wets plates 29 while the other phase wets plates 25, 27 and 28.

All of plates 25, 27 and 29 are mounted on an axially located tie rod 30 with spacer sleeves 31 disposed therein to support the plates in proper location within the column. In addition plates 29 contain buttons 32 on their lower surface near the periphery thereof to maintain a constant spacing of the plates 29 during the deflection of the plates that might occur as a result of the pulsing action.

Operation of the above-described pulse column will be illustrated by describing several specific examples. These studies were carried out in a pulsed, uni-diameter, 3-inch glass column with a 9-foot plate section. A capacitance probe was used for top interface control. The specific operation carried out was the extraction of uranium from an organic solvent by water which forms one step in a commercial process for the separation of plutonium from uranium.

The feed was an extract solution of uranyl nitrate in a mixture of tributyl phosphate and kerosene which was 0.063 M in $HNO_3$ and 0.332 M in uranyl nitrate hexahydrate. The extraction was performed with water which was 0.01 M in $HNO_3$. The aqueous to organic flow ratio was 1 to 1.

In addition to other tests unrelated to the present invention, a test on apparatus illustrating the present invention and a test on apparatus illustrating the prior art were performed. The prior art device simulated the column employed in production and contained stainless steel nozzle plates located 4 inches apart with 10% free area and 1/8 inch hole diameter.

The device constructed according to the present invention is that shown in FIGS. 1 and 2 of the drawing. The plates 25 were of stainless steel and were spaced three inches from the phase reversal cartridges 26. These plates 25 contained 23% free area and the perforations therein were 1/8 inch in diameter. The phase reversal cartridges 26 were two inches in length and were formed of two stainless steel nozzle plates 27 and 28 and four polyethylene sieve plates 29. The nozzle plates 27 and 28 contained 23% free area and the nozzles were 3/16 inch in diameter. The polyethylene sieve plates 29 were 7/32 inch in thickness and were spaced 1/16 inch apart. The top sieve plate 29 was spaced 1/8 inch from the upper nozzle plate 27 while the bottom sieve plate 29 was spaced 3/4 inch from the lower nozzle plate 28. The polyethylene sieve plates contained 33% free area and the diameter of the openings therein was 3/16 inch.

Tests carried out on a column constructed according to this invention in comparison with tests carried out in the prior art device indicated that the capacity of the former was much greater than that of the latter while efficiency was equal or greater. Flooding occurred on the simulated plant column at a total volume velocity for both phases of 1005 gallons/hr. sq. ft. with a pulse amplitude of 0.5 inch and a pulse frequency of 60 cycles per minute. These are optimum conditions for the prior art device.

On the other hand the column constructed as specifically described herein can be operated at a capacity about 50% higher. Maximum capacity was attained with the column constructed according to the present invention with a pulse amplitude of 1.0 inch and a pulse frequency of 60 cycles/min. Under these conditions flooding did not occur until a volume velocity of 1508 gallons/hr. was reached.

The simulated plant cartridge operates best at a pulse amplitude of 0.5 inch whereas our novel cartridge operates best at a pulse amplitude of 1.0 inch. This is due to the physical structure of the cartridge. At a pulse amplitude of 0.5 inch flooding occurred in our cartridge due to organic build-up below the organic continuous region which was caused by insufficient organic transit through the section. This type of flooding was corrected by increasing the pulse amplitude to 1.0 inch.

The closely-spaced plastic plates in the column as shown in FIGS. 1 and 2 cause a reversal of continuous phase in the column. Operating conditions of the column are such that the aqueous phase is continuous over most of the column, as is conventional in the art. When a pulse directs a portion of the liquid into the area occupied by the plastic plates, separation of the two phases occurs. When the packing is tight as shown, the organic phase will become continuous and the aqueous dispersed because the plastic plates are wet by the organic phase preferentially to the aqueous phase.

As the organic is expelled from the packing by the pulse, it again meets a continuous aqueous phase and is dispersed in it. Thus each phase progresses through alternate layers where the organic phase is continuous and layers where the aqueous phase is continuous in its path through the column.

Application of this invention to a conventional column improves contact efficiency through the following:

(1) Improved mixing of the dispersed phase.
(2) Increased residence time of the dispersed phase.
(3) Increased rate of drop formation and coalescence.
(4) Increased interfacial area between phases.
(5) Increased contact time between phases.

Column stability and capacity are improved for the following reasons:

(1) Channeling and eddies are limited to the regions between packed sections.
(2) Backmixing of the continuous phase is reduced or eliminated. Backmixing, as used here, refers to the flow of a phase in a direction opposite to its normal flow in the column.
(3) A more even vertical distribution of the dispersed phase occurs.
(4) Dispersed phase drop size is more uniform.
(5) The dispersed phase velocity is more uniform.
(6) The continuous phase velocity is more uniform.

In more detail the higher efficiency and capacity are largely due to increased mixing and increased dispersed phase drop size. In conventional columns large drop size gives high capacity but low efficiency. In our column large drop size gives high capacity while retaining to a considerable extent the efficiency of smaller drop size. Large drops are obviously less efficient than small drops because there is less contact area. According to our invention, however, the continuous phase is reversed in alternate layers, thereby promoting contact between phases. At the same time the drop size remains large because drops tend to become smaller as they pass along the column. Since the drops in our column only traverse the column until they reach a phase reversal region and then are reformed, the increased capacity due to large drop size is retained.

Another important reason for the improvement according to the present invention resides in the fact of internal mixing of both phases. This also is due to the continuous phase reversal. The continuous phase can mix within itself whereas the discontinuous phase cannot. In conventional columns operated under emulsion-type conditions so that a reasonable capacity can be attained one phase is always discontinuous and there is no internal mixing within this phase.

Further and greatly increased capacity with only a slight decrease in efficiency can be attained for the described column by the use of a dual pulse. One of the pulses is of short amplitude and high frequency for the purpose of mixing in the phase reversal cartridge and the other pulse is of high amplitude and low frequency for the purpose of displacing the emulsion in the phase reversal cartridge. Column capacity can be increased by as much as a factor of three by this expedient.

It will be noted that four plates 29 were employed to cause reversal of continuous phase. Phase inversion can be attained with a minimum of two organic wet plates or two plates having organic wet surfaces facing each other. As an example, phase inversion was noted between plates coated on one surface with fluorothene with the organic wet surfaces facing one another. The percent free area was 23%, the hole size 0.04 inch, the plate spacing one inch, and the pulse a square wave of 0.75 inch amplitude and a frequency of 30 cycles/min. A similar effect was achieved with a cartridge which has two organic wet plates spaced one inch apart having 23% free area with 3/16 inch holes and operated at from 35 to 110 cycles/min. at a pulse amplitude of about 0.6 inch. Increasing the number of plates to four increases the efficiency of the cartridge.

Although a quantity of organic continuous emulsion tends to form around a single organic wet plate, a single plate does not provide a sufficiently large organic wet region to obtain the advantages of the present invention. Two or more plates in relatively close proximity will create a region about the plates in which the organic phase is continuous and such a region is large enough to obtain the benefits of the present invention.

A further test indicated that satisfactory results were not attained when stainless steel plates 25 were replaced with polyethylene sieve plates.

The concept of this invention has been employed in plant scale columns on the extraction of irradiated uranium from a water solution thereof with a 30 vol. percent solution of tributyl phosphate in hydrocarbon diluent. The following is a tabular description of the column used.

Pulse amplitude extraction
section _____ 1.1 inch.
Pulse frequency _____ 35–110 cycles/min.
Vol. vel. extraction section___ 1000 gals./hr. ft.$^2$.
Length extraction section____ 14 ft., dia. 24 in.
Length scrub section_____ 13.2 ft., dia. 32 in.
Cartridge extraction section:
    S.S. plates_____ 23% free area, $\frac{3}{16}$ in. holes, 2 in. spacing.
Cartridge scrub section_____ Alternating 2 S.S., 2 fluorothene plates.
    S.S. plates_____ 21% free area, 0.85 in. hole, spacing 1 in.
    Fluorothene plates_____ 23% free area, $\frac{3}{16}$ in. holes, spacing 1 in.

Feed was at the center of the column with the solvent being introduced at the bottom of the column and a scrub solution at the top of the column. The section below the feed point is the extraction section and the section thereabove is the scrub section. As can be seen, the present invention is applied only to the scrub section.

The performance of the column over a period of about a month was excellent. Waste losses consistently remained less than 0.001 percent. Use of the scrub cartridge according to the present invention in conjunction with a bottom interface location improved the decontamination of the uranium in the cycle by a factor of 10 to 20. Uranium product previously produced in an aqueous-continuous column with a standard cartridge ranged from 2 to 12 in gamma ratio whereas the product currently produced ranges from 0.3 to 1.2.

It is reiterated that continuous phase reversal cannot be obtained by a single plate. Therefore a column employing alternating plates of organic wet material and aqueous wet material, although having certain advantages, does not operate in accordance with this invention.

The phase reversal cartridge will act as a seal to prevent backmixing provided the maximum pulse amplitude and frequency are such as to cause aqueous flow down through the cartridge and organic flow up through the cartridge without impairing its ability to act as a seal. The phase reversal cartridge need not be operated so as to prevent backmixing. It may be operated to prevent backmixing in the scrub section of a column while not being so operated in the extraction section of a column.

In addition to employing plates as packing to cause reversal of continous phase, any kind of packing conventionally used in packed columns can be used provided the material will wet the phase which is desired to become continuous in the packed area of the column. For example, plastic Raschig rings or shavings can be used to make the organic phase continuous while metal shavings or rings can be used to make the aqueous phase continuous in a column normally operated with organic continuous.

Other arrangements of the packing which will accomplish the same results as that shown in FIGS. 1 and 2 are shown in FIGS. 3 to 5. In FIG. 3 a column 33 has sieve plates 34 thereacross at regular intervals. These plates are of a material which is wet by the phase which would normally be continuous in the column. Alternate interplate spaces 35 contain packing 36 of a material which is wet by the phase which is normally dispersed in the column. For example, sieve plates 34 may be of stainless steel and the packing 36 may be shavings of a plastic such as polyethylene or fluorothene to reverse a normally continuous aqueous phase to a continuous organic phase in the packed space. This type of construction has low organic retention. To prevent backmixing, packed section void space must be greater than the pulsed volume.

FIG. 4 represents a construction which has a higher organic retention than the construction shown in FIG. 3. According to this modification a column 37 contains plates 38 wet by the normally continuous phase and plates 39, located just below every third plate 38, which are wet by the normally dispersed phase. Between plate 39 and the plate 38 located therebelow is a packing 40 of the same material as plate 39. The packing material again will cause a reversal of phases therein. In operating this column the pulse amplitude must be greater than the distance between plate 38 and plate 39 immediately therebelow.

FIG. 5 shows another construction which has still greater organic retention. According to this modification a column 41 has a plurality of plates 42 in groups of four extending thereacross. These plates 42 are of a material which is wet by the normally continuous phase. Between groups of plates 42 there is a phase reversal cartridge 43 comprising a pair of plates 44 wet by the normally dispersed phase with packing 45 therebetween of the same material as plates 44. The distance between plates 44 and the adjacent plates 42 must be less than the pulse amplitude.

FIG. 6 illustrates another aspect of the present invention. This figure discloses various means for separating and disengaging phases within a pulse column which is being operated under emulsion-type conditions. The figure shows a column 46 having regularly spaced perforated plates 47 extending thereacross. Loose packing 48 may be included in various interplate spaces to separate and disengage phases. This packing 48 is of a material which is wet by the phase which does not wet the plates 47. For example, if plates 47 are of stainless steel, packing 48 can be of polyethylene shavings. In order to attain the desired separation and disengaging of phases the volume of space without packing in these interplate spaces should be four times the pulsed volume. This result is attained by constraining the packing to the desired volume with screen 49 of, for example, paraboloid or hour-glass shape. The particular shape selected is one which will coalesce and channel the dispersed phase through the packing so as not to drag continuous phase up in the wake of rising drops as well as to prevent mixing of continuous phase below the packing with that above it.

This figure also shows a mechanical insert 50 which is shown in more detail in FIG. 7. This mechanical insert consists of a baffle 51 having a slanting portion 52 joined to the column wall and a vertical portion 53, a chimney 54 consisting of portions 55 and 56 of different diameter joined by a ledge 57 with the portion 56 of greater diameter enclosing the vertical portion 53 of the baffle 51 in spaced relation thereto, and a hood 58 having a gas vent 59 at the center thereof over the portion 55 of smaller diameter of the chimney 54.

This mechanical insert serves to separate and disengage phases to prevent transport of material in the wake of dispersed drops rising up the column. The dispersed phase will coalesce in the insert and be redispersed in the column in a region different from where it coalesced.

A mechanical insert or an area of loose packing to improve efficiency by negating transport phenomena resulting from the jet mixing of the pulse through a perforated plate and transport in the wake of rising dispersed phase is primarily intended for use in the scrub section of a pulse column where backmixing is undesirable. One or more of such inserts may be used as is deemed desirable.

It will be understood that this invention is not to be limited to the details given herein but that it may be modified within the scope of the appended claims.

What is claimed is:

1. A method of operating an extraction column comprising introducing a light liquid phase at the bottom of the column and a heavy liquid phase which is immiscible with the light liquid at the top of the column at a sufficient rate to establish emulsion-type conditions in the column, whereby the liquid phases pass through the column in countercurrent relation, superimposing two up-and-down pulsing motions on the countercurrent flow of the liquid phases, one of said pulses being of high amplitude and low frequency and the other of said pulses being of low amplitude and high frequency, and establishing and maintaining a plurality of layers within the column wherein in every other layer the light phase is continuous and in the remaining layers the heavy phase is continuous whereby each phase progresses through alternate regions where the heavy phase is continuous and regions where the light phase is continuous in its path through the column.

2. An apparatus for intimately contacting and separating substantially immiscible liquids of different specific gravities comprising a hollow column, an inlet for heavy liquid and an outlet for light liquid at the top of the column, an inlet for light liquid and an outlet for heavy liquid at the bottom of the column, a plurality of stainless steel perforated plates extending across the column, a pulse generator connected to the lower end of the column, including means for superimposing two up-and-down pulsing motions on the countercurrent flow of the liquid phases, one of said pulses being of high amplitude and low frequency and the other of said pulses being of low amplitude and high frequency, and phase inversion cartridges located at spaced intervals in the column, said cartridges consisting of a pair of stainless steel nozzle plates extending across the column with the nozzles of the nozzle plates pointed away from each other, and a plurality of closely spaced polyethylene sieve plates extending across the column between said nozzle plates.

References Cited in the file of this patent

UNITED STATES PATENTS

| | | |
|---|---|---|
| 2,662,001 | Burns et al. | Dec. 8, 1953 |
| 2,714,056 | Poffenberger | July 26, 1955 |
| 2,811,423 | Bradley | Oct. 29, 1957 |
| 2,847,283 | Figg | Aug. 12, 1958 |
| 2,919,978 | Mapes | Jan. 5, 1960 |

FOREIGN PATENTS

| | | |
|---|---|---|
| 233,878 | Great Britain | May 21, 1925 |

OTHER REFERENCES

Geier: Symposium on Reprocessing of Irradiated Fuels, TID-7534, Technical Information Service Extension, Oak Ridge, Tennessee, May 25, 1957, pp. 107–129.

Geier: Proceedings of the Second United Nations International Conference on the Peaceful Uses of Atomic Energy, vol. 17, pp. 193–199.

Sage et al.: "Pulse Column Variables," Chem. Eng. Prog. Symposium Series (Nuclear Eng.), vol. 50, No. 13, 1954, pp. 179–190.